United States Patent [19]

Joslyn

[11] 4,009,744
[45] Mar. 1, 1977

[54] BICYCLE BAG

[76] Inventor: John A. Joslyn, 2441 N. 111th St., Wauwatosa, Wis. 53213

[22] Filed: Oct. 1, 1975

[21] Appl. No.: 618,591

[52] U.S. Cl. .................... 150/52 R; 224/42.03 B
[51] Int. Cl.² ........................................ B60R 9/10
[58] Field of Search ............ 150/3, 7, 52 R, 52 K; 206/335; 135/7; 224/42.03 A, 42.03 B

[56] References Cited

UNITED STATES PATENTS

| 1,594,989 | 8/1926 | Auster | 150/7 X |
| 2,848,031 | 8/1958 | Svec | 150/3 |
| 3,820,651 | 6/1974 | Levy | 150/52 R X |

FOREIGN PATENTS OR APPLICATIONS

| 18,486 | 12/1898 | United Kingdom | 150/52 K |

*Primary Examiner*—Donald F. Norton
*Attorney, Agent, or Firm*—Henry C. Fuller

[57] ABSTRACT

A bicycle storage bag includes two side panels with lower margins which are connected together to provide a weather seal on one side of the bag above the bottom of the bag. The bag is dropped over the bicycle and the margin or flap of one side panel is folded beneath the wheels and upwardly for connection to the other panel with snap fasteners. The side panels also include openings for receiving the support hooks of vehicle bicycle racks. Draw sleeves around the openings provide a weather seal. The openings in the side panels also enable a cable or chain from a bicycle lock to be extended through the opening, around the frame and out the opening to be fastened to the bike rack or other fixture.

2 Claims, 2 Drawing Figures

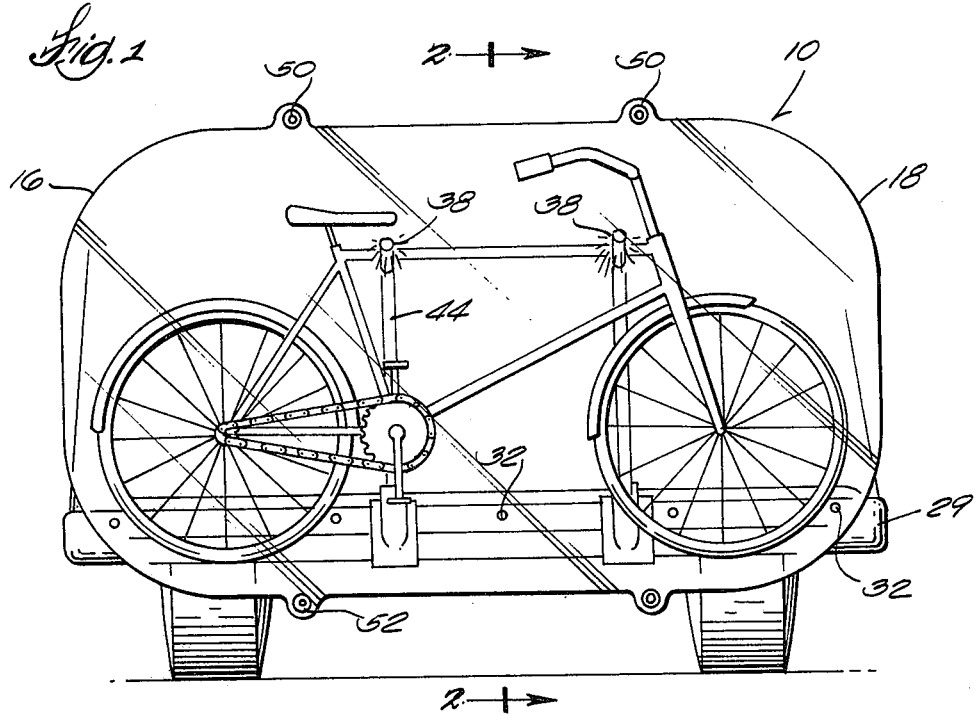
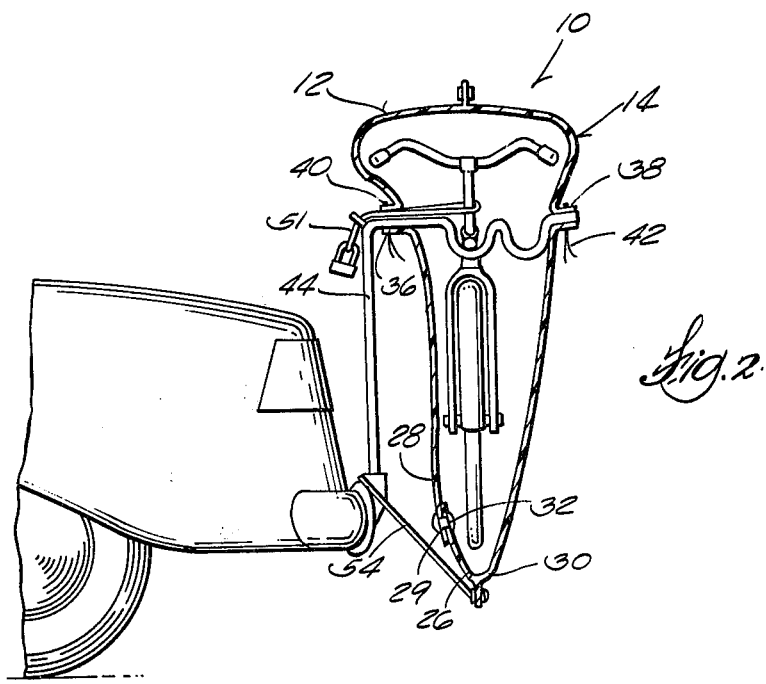

BICYCLE BAG

SUMMARY OF INVENTION

The invention provides a protective enclosure for a bicycle to prevent exposure to the weather and road oils and dirt, etc. The opposed side panels for the bag or enclosure are provided with margins which extend longitudinally of the bag and are connected along a linear closure line located above the bottom of the bag. This arrangement facilitates insertion of the bicycle into the bag and fastening of the margins. The bag can be dropped over the bicycle and the margin or flap of the longer of the side panels folded beneath the bicycle wheels and upwardly for connection to the lower margin of the other side panel. Snap fasteners, a zipper, or other fastening devices such as Velcro strips can be employed to secure the margins together and enclose the bicycle.

The side panels of the bicycle enclosure also include openings for receiving the horizontally extending support hooks for a bicycle rack of the type connected to vehicle bumpers. The openings are defined by sleeves which extend outwardly from the panels and which can be provided with draw strings to weather seal the openings against the bicycle support hooks. The openings also enable the user to extend a bicycle chain or cable lock through an opening around the bicycle frame for connection to the vehicle bike rack.

Further objects, advantages, and features of the invention will become apparent from the following disclosure.

DESCRIPTION OF DRAWINGS

FIG. 1 is a side elevational view of the bicycle storage bag of the invention with the bag and enclosed bike supported on a vehicle bike rack.

FIG. 2 is a sectional view along lines 2—2 of FIG. 1.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The protective enclosure 10 includes 2 opposed side panels 12, 14. The side panels, 12, 14 can be formed from a single piece of material with seams at the ends of the bag at 16, 18. Woven or non-woven material can be employed. Various tent fabrics are suitable.

The panel 14 has a depth or width greater than the panel 12 and terminates in a lower margin 26. The panel 12 has a lower margin 28. Means are provided for connecting the margins 26, 28 to form a linear closure line located above the bottom of the bag at 29. In the disclosed construction, the means comprises a plurality of snap fasteners 32 which extend along a line longitudinally of the bag. A zipper or other fastening arrangements can be employed. The margin 28 desirably overlaps on the outside of the margin 26 to prevent entry of water in the bag.

The bicycle enclosure also includes two openings 36 in panels 12 and two openings 38 in panel 14. The openings 36, 38 are defined by tubular sleeves 40 which extend outwardly from the panels 12, 14. Drawstrings 42, elastic bands or the like can be provided to provide a weather seal around the bike rack support member 44. The openings in the side panels can also be employed when using a bicycle chain or cable lock 51 to enable the user to extend the chain or cable around the bike frame and out the opening for connection to a bike rack.

The bicycle enclosure can also be provided with a series of grommets 50 on the upper part of the bag and grommets 52 at the bottom 30 of the bag to enable connection of ropes 54 which can be fastened to the vehicle when the vehicle is under way. Such ropes minimize flapping and thus, wear on the bag when the tow vehicle is in motion.

I claim:

1. A protective enclosure for a two-wheeled cycle comprising a bag having two opposed flexible side panels, said side panels having first and second longitudinally extending margins, with said first margin forming a bottom for said enclosure and extending upwardly a sufficient distance to overlap said second margin to form a linear closure line between said panels above the bottom of said enclosure, means for detachably connecting said margins to form a weather seal along said closure line and wherein said side panels have two sets of oppositely located openings adapted to receive bicycle supporting members of a bicycle rack on a vehicle, said openings being defined by generally tubular sleeve portions formed in said side panels and extending outwardly therefrom and means to tighten said sleeves to provide a weather seal about said openings.

2. A protective enclosure for a two-wheeled cycle comprising a bag having two opposed flexible side panels defining a bag interior, said side panels having first and second longitudinally extending margins and means for detachably connecting said margins to form a weather seal and wherein said side panels have two sets of oppositely located openings adapted to receive bicycle supporting members of a bicycle rack on a vehicle and closure means to seal the openings and the bag interior against the weather.

* * * * *